(12) United States Patent
Fridlund

(10) Patent No.: US 10,486,245 B2
(45) Date of Patent: Nov. 26, 2019

(54) ELEMENT AND METHOD FOR PROVIDING DISMANTLING GROOVE

(71) Applicant: Välinge Innovation AB, Viken (SE)

(72) Inventor: Magnus Fridlund, Ahus (SE)

(73) Assignee: VALINGE INNOVATION AB, Viken (SE)

( * ) Notice: Subject to any disclaimer, the term of this patent is extended or adjusted under 35 U.S.C. 154(b) by 459 days.

(21) Appl. No.: 15/428,469

(22) Filed: Feb. 9, 2017

(65) Prior Publication Data

US 2017/0227032 A1    Aug. 10, 2017

(30) Foreign Application Priority Data

Feb. 9, 2016    (SE) ...................................... 1650159

(51) Int. Cl.
*B23C 3/30*    (2006.01)
*B27M 1/04*    (2006.01)
(Continued)

(52) U.S. Cl.
CPC ................. *B23C 3/30* (2013.01); *B27F 1/04* (2013.01); *B65D 9/34* (2013.01); *F16B 5/0044* (2013.01);
(Continued)

(58) Field of Classification Search
CPC ........... Y10T 403/148; Y10T 403/1674; Y10T 409/303752; Y10T 409/303808;
(Continued)

(56) References Cited

U.S. PATENT DOCUMENTS 291,032 A    1/1884    Cleland
634,581 A    10/1899    Miller
(Continued)

FOREIGN PATENT DOCUMENTS

CH    365 507 A    11/1962
CH    685 276 A5    5/1995
(Continued)

OTHER PUBLICATIONS

U.S. Appl. No. 16/220,574.
(Continued)

*Primary Examiner* — Erica E Cadugan
(74) *Attorney, Agent, or Firm* — Buchanan Ingersoll & Rooney P.C.

(57) ABSTRACT

A method for providing a dismantling groove in an element for a product to be assembled by a plurality of elements locked by a locking arrangement including a flexible tongue is disclosed. The method includes providing an insertion groove and a dismantling groove in the same element. The dismantling groove extends along the element between a first side and a second side and is configured for receiving the flexible tongue of the locking arrangement for locking the element to another element having a tongue groove. The dismantling groove is provided in the element such that it extends from the first side to the insertion groove and along a portion of the insertion groove, and is configured to receive a dismantling tool for dismantling the element from the other element. An element with an insertion groove and a dismantling groove is also disclosed.

7 Claims, 4 Drawing Sheets

(51) Int. Cl.
*F16B 12/26* (2006.01)
*F16B 5/00* (2006.01)
*B27F 1/04* (2006.01)
*B65D 6/34* (2006.01)
*A47B 47/00* (2006.01)

(52) U.S. Cl.
CPC .......... *F16B 12/26* (2013.01); *A47B 2230/07* (2013.01); *B23C 2220/04* (2013.01); *B23C 2220/36* (2013.01); *Y10S 403/10* (2013.01); *Y10S 403/11* (2013.01); *Y10T 403/148* (2015.01); *Y10T 409/303752* (2015.01)

(58) Field of Classification Search
CPC . Y10T 409/304144; Y10T 409/304424; Y10S 403/10; A47B 2230/07; A47B 2230/0062; B23C 3/28; B23C 3/30; B23C 3/305; B23C 3/34; B23C 2220/36; B23C 2220/04
USPC ....... 403/9, 20, DIG. 10; 409/131–132, 143, 409/138; 144/371
See application file for complete search history.

(56) References Cited

U.S. PATENT DOCUMENTS

| | | |
|---|---|---|
| 701,000 A | 5/1902 | Ahrens |
| 861,911 A | 7/1907 | Stewart |
| 881,673 A | 3/1908 | Ellison |
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 11/1944 | Kramer |
| 2,496,184 A | 1/1950 | Von Canon |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,765,465 A | 10/1973 | Gulistan |
| 3,784,271 A | 1/1974 | Schreiber |
| 3,884,002 A | 5/1975 | Logie |
| 3,885,845 A | 5/1975 | Krieks |
| 3,981,118 A | 9/1976 | Johnson et al. |
| 4,089,614 A | 5/1978 | Harley |
| 4,099,887 A | 7/1978 | Mackenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crowder |
| 4,279,397 A | 7/1981 | Larsson |
| 4,299,067 A | 11/1981 | Bertschi |
| 4,308,961 A | 1/1982 | Kunce |
| 4,324,517 A | 4/1982 | Dey |
| 4,403,886 A | 9/1983 | Haeusler |
| 4,405,253 A | 9/1983 | Stockum |
| 4,509,648 A | 4/1985 | Govang |
| 4,593,734 A * | 6/1986 | Wallace .................. A47G 1/10 144/136.1 |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,360,121 A | 11/1994 | Sothman |
| 5,375,802 A | 12/1994 | Branham, II |
| 5,423,155 A | 6/1995 | Bauer |
| 5,451,102 A | 9/1995 | Chuan |
| 5,458,433 A * | 10/1995 | Stastny .................. B27F 5/02 144/136.95 |
| 5,471,804 A | 12/1995 | Winter, IV |
| 5,475,960 A | 12/1995 | Lindal |
| 5,499,667 A * | 3/1996 | Nakanishi .................. B27C 5/00 144/134.1 |
| 5,499,886 A | 3/1996 | Short et al. |
| 5,507,331 A * | 4/1996 | Nakanishi ............. B23C 5/1054 144/371 |
| 5,527,103 A | 6/1996 | Pittman |
| 5,658,086 A | 8/1997 | Brokaw et al. |
| 5,711,115 A | 1/1998 | Wirt |
| 5,775,521 A | 7/1998 | Tisbo |
| 5,810,505 A | 9/1998 | Henriott |
| 5,893,617 A | 4/1999 | Lee |
| 5,944,294 A | 8/1999 | Baer |
| 5,950,389 A | 9/1999 | Porter |
| 6,050,426 A | 4/2000 | Leurdijk |
| 6,142,436 A | 11/2000 | Thurston et al. |
| 6,312,186 B1 | 11/2001 | Röck et al. |
| 6,363,645 B1 | 4/2002 | Hunter |
| 6,413,007 B1 | 7/2002 | Lambright |
| 6,491,172 B2 | 12/2002 | Chance |
| 6,505,452 B1 | 1/2003 | Hannig |
| 6,547,086 B1 | 4/2003 | Harvey |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,223,045 B2 | 5/2007 | Migli |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,033,074 B2 | 10/2011 | Pervan |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |
| 8,234,830 B2 | 8/2012 | Pervan |
| 8,365,499 B2 | 2/2013 | Nilsson et al. |
| 8,387,327 B2 | 3/2013 | Pervan |
| 8,464,408 B2 | 6/2013 | Hazzard |
| 8,495,849 B2 | 7/2013 | Pervan |
| 8,505,257 B2 | 8/2013 | Boo et al. |
| 8,544,230 B2 | 10/2013 | Pervan |
| 8,596,013 B2 | 12/2013 | Boo |

(56) References Cited

U.S. PATENT DOCUMENTS

| | | | |
|---|---|---|---|
| 8,602,227 | B1 | 12/2013 | McDonald |
| 8,615,952 | B2 | 12/2013 | Engström |
| 8,713,886 | B2 | 5/2014 | Pervan |
| 8,745,952 | B2 | 6/2014 | Perra |
| 8,764,137 | B2 | 7/2014 | Fehre |
| 8,776,473 | B2 | 7/2014 | Pervan |
| 8,833,028 | B2 | 9/2014 | Whispell et al. |
| 8,864,407 | B1 | 10/2014 | Sorum |
| 8,882,416 | B2 * | 11/2014 | Baur ................ B23C 5/08 409/143 |
| 8,887,468 | B2 | 11/2014 | Håkansson et al. |
| 9,175,703 | B2 | 11/2015 | Maertens |
| 9,216,541 | B2 | 12/2015 | Boo |
| 9,290,948 | B2 | 3/2016 | Cappelle et al. |
| 9,375,085 | B2 | 6/2016 | Derelöv |
| 9,538,842 | B2 | 1/2017 | Håkansson et al. |
| 9,655,442 | B2 | 5/2017 | Boo et al. |
| 9,700,157 | B2 | 7/2017 | Keyvanloo |
| 9,714,672 | B2 | 7/2017 | Derelöv et al. |
| 9,723,923 | B2 | 8/2017 | Derelöv |
| 9,726,210 | B2 | 8/2017 | Derelöv et al. |
| 9,745,756 | B2 | 8/2017 | Hannig |
| 9,758,973 | B2 | 9/2017 | Segaert |
| 9,763,528 | B2 | 9/2017 | Lung |
| 9,809,983 | B2 | 11/2017 | Trudel |
| 9,945,121 | B2 | 4/2018 | Derelöv |
| 10,034,541 | B2 | 7/2018 | Boo et al. |
| 10,202,996 | B2 | 2/2019 | Håkansson et al. |
| 2002/0170258 | A1 | 11/2002 | Schwitte et al. |
| 2005/0042027 | A1 | 2/2005 | Migli |
| 2005/0236544 | A1 | 10/2005 | Mancino |
| 2005/0247653 | A1 | 11/2005 | Brooks |
| 2006/0091093 | A1 | 5/2006 | Armari |
| 2006/0101769 | A1 | 5/2006 | Pervan et al. |
| 2006/0180561 | A1 | 8/2006 | Wisnoski et al. |
| 2006/0236642 | A1 | 10/2006 | Pervan |
| 2006/0273085 | A1 | 12/2006 | Casto |
| 2007/0006543 | A1 | 1/2007 | Engström |
| 2008/0010937 | A1 | 1/2008 | Pervan et al. |
| 2008/0066415 | A1 | 3/2008 | Pervan |
| 2008/0193209 | A1 | 8/2008 | Henderson |
| 2008/0216435 | A1 | 9/2008 | Nolan |
| 2008/0236088 | A1 | 10/2008 | Hannig et al. |
| 2009/0014401 | A1 | 1/2009 | Tallman |
| 2009/0064624 | A1 | 3/2009 | Sokol |
| 2010/0028592 | A1 | 2/2010 | Barkdoll et al. |
| 2010/0083603 | A1 | 4/2010 | Goodwin |
| 2010/0173122 | A1 | 7/2010 | Susnjara |
| 2010/0289389 | A1 | 11/2010 | Crabtree, II |
| 2011/0225921 | A1 | 9/2011 | Schulte |
| 2011/0225922 | A1 | 9/2011 | Pervan et al. |
| 2011/0280655 | A1 | 11/2011 | Maertens |
| 2011/0283650 | A1 | 11/2011 | Pervan et al. |
| 2012/0009383 | A1 | 1/2012 | Hardesty |
| 2012/0027967 | A1 | 2/2012 | Maertens |
| 2012/0073235 | A1 | 3/2012 | Hannig |
| 2012/0124932 | A1 | 5/2012 | Schulte et al. |
| 2012/0145845 | A1 | 6/2012 | Hightower |
| 2012/0180416 | A1 | 7/2012 | Perra et al. |
| 2012/0279161 | A1 | 11/2012 | Håkansson et al. |
| 2012/0286637 | A1 | 11/2012 | Fehre |
| 2013/0014463 | A1 | 1/2013 | Pervan |
| 2013/0048632 | A1 | 2/2013 | Chen |
| 2013/0071172 | A1 | 3/2013 | Maertens et al. |
| 2013/0081349 | A1 | 4/2013 | Pervan |
| 2013/0097846 | A1 | 4/2013 | Pettigrew |
| 2013/0111845 | A1 | 5/2013 | Pervan |
| 2013/0170904 | A1 | 7/2013 | Cappelle et al. |
| 2013/0232905 | A2 | 9/2013 | Pervan |
| 2013/0287484 | A1 | 10/2013 | Phillips |
| 2014/0013919 | A1 | 1/2014 | Gerke et al. |
| 2014/0055018 | A1 | 2/2014 | Shein et al. |
| 2014/0111076 | A1 | 4/2014 | Devos |
| 2014/0286701 | A1 | 9/2014 | Sauer |
| 2014/0294498 | A1 | 10/2014 | Logan |
| 2015/0035422 | A1 | 2/2015 | Håkansson et al. |
| 2015/0078807 | A1 | 3/2015 | Brännström et al. |
| 2015/0078819 | A1 | 3/2015 | Derelöv et al. |
| 2015/0196118 | A1 | 7/2015 | Derelöv |
| 2015/0198191 | A1 | 7/2015 | Boo |
| 2015/0230600 | A1 | 8/2015 | Schulte |
| 2015/0368896 | A1 | 12/2015 | Schulte |
| 2016/0000220 | A1 | 1/2016 | Devos |
| 2016/0007751 | A1 | 1/2016 | Derelöv |
| 2016/0145029 | A1 | 5/2016 | Ranade et al. |
| 2016/0174704 | A1 | 6/2016 | Boo et al. |
| 2016/0186925 | A1 | 6/2016 | Bettin |
| 2016/0192775 | A1 | 7/2016 | Andersson |
| 2016/0270531 | A1 | 9/2016 | Derelöv |
| 2017/0079433 | A1 | 3/2017 | Derelöv et al. |
| 2017/0089379 | A1 | 3/2017 | Pervan |
| 2017/0097033 | A1 | 4/2017 | Håkansson et al. |
| 2017/0159291 | A1 | 6/2017 | Derelöv |
| 2017/0208938 | A1 | 7/2017 | Derelöv et al. |
| 2017/0227031 | A1 | 8/2017 | Boo |
| 2017/0227035 | A1 | 8/2017 | Fridlund |
| 2017/0234346 | A1 | 8/2017 | Fridlund |
| 2017/0298973 | A1 | 10/2017 | Derelöv |
| 2017/0360193 | A1 | 12/2017 | Boo |
| 2018/0080488 | A1 | 3/2018 | Derelöv |
| 2018/0087552 | A1 | 3/2018 | Derelöv et al. |
| 2018/0112695 | A1 | 4/2018 | Boo et al. |
| 2018/0119717 | A1 | 5/2018 | Derelöv |
| 2018/0202160 | A1 | 7/2018 | Derelöv |
| 2018/0328396 | A1 | 11/2018 | Fransson et al. |
| 2019/0113061 | A1 | 4/2019 | Håkansson et al. |
| 2019/0166989 | A1 | 6/2019 | Boo et al. |
| 2019/0191870 | A1 | 6/2019 | Derelöv |
| 2019/0195256 | A1 | 6/2019 | Derelöv |

FOREIGN PATENT DOCUMENTS

| | | |
|---|---|---|
| CH | 696 889 A5 | 1/2008 |
| CH | 698 988 B1 | 12/2009 |
| CN | 101099618 A | 1/2008 |
| CN | 203424576 U | 2/2014 |
| DE | 26 35 237 A | 2/1978 |
| DE | 31 03 281 A1 | 8/1982 |
| DE | 298 20 031 U1 | 2/1999 |
| DE | 20 2008 011 589 U1 | 11/2008 |
| DE | 20 2009 008 825 U1 | 10/2009 |
| DE | 10 2008 035 293 A1 | 2/2010 |
| DE | 10 2009 041 142 A1 | 3/2011 |
| DE | 10 2011 057 018 A1 | 6/2013 |
| DE | 10 2014 110 124 A1 | 1/2016 |
| EP | 0 060 203 A2 | 9/1982 |
| EP | 0 060 203 A3 | 9/1982 |
| EP | 0 362 968 A | 4/1990 |
| EP | 0 675 332 A2 | 10/1995 |
| EP | 0 871 156 A2 | 10/1998 |
| EP | 1 048 423 A2 | 11/2000 |
| EP | 1 048 423 B9 | 5/2005 |
| EP | 1 650 375 A1 | 4/2006 |
| EP | 1 671 562 A1 | 6/2006 |
| EP | 1 863 984 A1 | 12/2007 |
| EP | 1 922 954 A1 | 5/2008 |
| EP | 2 017 403 A2 | 1/2009 |
| EP | 2 037 128 A1 | 3/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 062 731 A5 | 6/1971 |
| FR | 2 517 187 A1 | 6/1983 |
| FR | 2 597 173 A1 | 10/1987 |
| FR | 2 602 013 A1 | 1/1988 |
| GB | 1 022 377 A | 3/1966 |
| GB | 2 482 213 A | 1/2012 |
| GB | 2 520 927 A | 6/2015 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |

(56) References Cited

FOREIGN PATENT DOCUMENTS

| WO | WO-90/07066 A | * | 6/1990 |
|---|---|---|---|
| WO | WO 99/22150 A1 | | 5/1999 |
| WO | WO 00/66856 A1 | | 11/2000 |
| WO | WO 01/02669 A1 | | 1/2001 |
| WO | WO 01/02670 A1 | | 1/2001 |
| WO | WO 01/51733 A1 | | 7/2001 |
| WO | WO 01/53628 A1 | | 7/2001 |
| WO | WO 02/055809 A1 | | 7/2002 |
| WO | WO 02/055810 A1 | | 7/2002 |
| WO | WO 03/016654 A1 | | 2/2003 |
| WO | WO 03/027510 A2 | | 4/2003 |
| WO | WO 03/083234 A1 | | 10/2003 |
| WO | WO 2004/079130 A1 | | 9/2004 |
| WO | WO 2005/068747 A1 | | 7/2005 |
| WO | WO 2006/043893 A1 | | 4/2006 |
| WO | WO 2006/103500 A1 | | 10/2006 |
| WO | WO 2006/104436 A1 | | 10/2006 |
| WO | WO 2007/015669 A2 | | 2/2007 |
| WO | WO 2007/015669 A3 | | 2/2007 |
| WO | WO 2007/079845 A1 | | 7/2007 |
| WO | WO 2008/004960 A2 | | 1/2008 |
| WO | WO 2008/004960 A8 | | 1/2008 |
| WO | WO 2008/017281 A1 | | 2/2008 |
| WO | WO 2008/017301 A2 | | 2/2008 |
| WO | WO 2008/017301 A3 | | 2/2008 |
| WO | WO 2008/150234 A1 | | 12/2008 |
| WO | WO 2010/023042 A1 | | 3/2010 |
| WO | WO 2010/070472 A2 | | 6/2010 |
| WO | WO 2010/070472 A3 | | 6/2010 |
| WO | WO 2010/070605 A2 | | 6/2010 |
| WO | WO 2010/070605 A3 | | 6/2010 |
| WO | WO 2010/082171 A2 | | 7/2010 |
| WO | WO 2010/087752 A1 | | 8/2010 |
| WO | WO 2011/012104 A2 | | 2/2011 |
| WO | WO 2011/012104 A3 | | 2/2011 |
| WO | WO 2011/085710 A1 | | 7/2011 |
| WO | WO 2011/151737 A2 | | 12/2011 |
| WO | WO 2011/151737 A3 | | 12/2011 |
| WO | WO 2011/151737 A9 | | 12/2011 |
| WO | WO 2011/151758 A2 | | 12/2011 |
| WO | WO 2011/151758 A3 | | 12/2011 |
| WO | WO 2012/095454 A1 | | 7/2012 |
| WO | WO 2012/154113 A1 | | 11/2012 |
| WO | WO 2013/009257 A1 | | 1/2013 |
| WO | WO 2013/025163 A1 | | 2/2013 |
| WO | WO 2013/080160 A1 | | 6/2013 |
| WO | WO 2013/093636 A2 | | 6/2013 |
| WO | WO 2013/093636 A3 | | 6/2013 |
| WO | WO 2013/118075 A1 | | 8/2013 |
| WO | WO 2014/072080 A1 | | 5/2014 |
| WO | WO 2014/108114 A1 | | 7/2014 |
| WO | WO 2014/121410 A1 | | 8/2014 |
| WO | WO 2015/015603 A1 | | 2/2015 |
| WO | WO 2015/038059 A1 | | 3/2015 |
| WO | WO 2015/105449 A1 | | 7/2015 |
| WO | WO 2015/105450 A1 | | 7/2015 |
| WO | WO 2015/105451 A1 | | 7/2015 |
| WO | WO 2017/131574 A1 | | 8/2017 |
| WO | WO 2017/135874 | | 8/2017 |
| WO | WO 2018/080387 A1 | | 5/2018 |

OTHER PUBLICATIONS

U.S. Appl. No. 16/220,585.
U.S. Appl. No. 16/228,975.
U.S. Appl. No. 16/361,609.
U.S. Appl. No. 16/386,732.
U.S. Appl. No. 16/386,810.
U.S. Appl. No. 16/386,824.
U.S. Appl. No. 16/386,874.
Derelöv, Peter, U.S. Appl. No. 16/220,574 entitled "Set of Panels," filed Dec. 14, 2018.
Derelöv, Peter, U.S. Appl. No. 16/220,585 entitled "Set of Panels," filed Dec. 14, 2018.
Håkansson, Niclas, et al., U.S. Appl. No. 16/228,975 entitled "Mechanical Locking System for Building Panels," filed Dec. 21, 2018.
Derelöv, Peter, et al., U.S. Appl. No. 16/361,609 entitled "Panels Comprising a Mechanical Locking Device and an Assembled Product Comprising the Panels," filed Mar. 22, 2019.
Boo, Christian, U.S. Appl. No. 16/386,732 entitled "Set of Panels With a Mechanical Locking Device," filed Apr. 17, 2019.
Boo, Christian, U.S. Appl. No. 16/386,810 entitled "Set of Panels With a Mechanical Locking Device," filed in the U.S. Patent and Trademark Office Apr. 17, 2019.
Boo, Christian, U.S. Appl. No. 16/386,824 entitled "Set of Panels With a Mechanical Locking Device," filed Apr. 17, 2019.
Derelöv, Peter, U.S. Appl. No. 16/386,874 entitled "Symmetric Tongue and T-Cross," filed Apr. 17, 2019.
U.S. Appl. No. 15/646,714.
U.S. Appl. No. 15/562,254.
U.S. Appl. No. 15/567,507.
U.S. Appl. No. 15/794,491.
U.S. Appl. No. 15/848,164.
U.S. Appl. No. 15/923,701.
International Search Report/Written Opinion dated May 11, 2017 in PCT/SE2017/050124, ISA/SE, Patent-och registreringsverket, Stockholm, SE, 12 pages.
Derelöv, Peter, et al., U.S. Appl. No. 15/646,714 entitled "Assembled Product and a Method of Assembling the Product", filed Jul. 11, 2017.
Derelöv, Peter, U.S. Appl. No. 15/562,254 entitled "Panel with a Slider", filed Sep. 27, 2017.
Boo, Christian, et al., U.S. Appl. No. 15/567,507 entitled "Panel With a Fastening Device," filed Oct. 18, 2017.
38 Derelöv, Peter, U.S. Appl. No. 15/794,491 entitled "Set of Panels with a Mechanical Locking Device", filed Oct. 26, 2017.
Fransson, Jonas, et al., U.S. Appl. No. 15/848,164 entitled "Device for Inserting a Tongue", filed Dec. 20, 2017.
Derelöv, Peter, U.S. Appl. No. 15/923,701 entitled "Panels Comprising a Mechanical Locking Device and an Assembled Product Comprising the Panels", filed Mar. 16, 2018.
U.S. Appl. No. 15/956,949.
U.S. Appl. No. 15/978,630.
U.S. Appl. No. 16/027,479.
Derelöv, Peter, U.S. Appl. No. 15/956,949 entitled "Panels for an Assembled Product", filed Apr. 19, 2018.
Fransson, Jonas, et al., U.S. Appl. No. 15/978,630 entitled "Elements and a Locking Device for an Assembled Product," filed May 14, 2018.
Boo, Christian, et al., U.S. Appl. No. 16/027,479 entitled "Panels Comprising a Mechanical Locking Device and an Assembled Product Comprising the Panels," filed Jul. 5, 2018.
U.S. Appl. No. 15/366,704.
U.S. Appl. No. 15/415,356.
U.S. Appl. No. 15/422,798.
U.S. Appl. No. 15/428,504.
U.S. Appl. No. 15/432,190.
Derelöv, Peter, U.S. Appl. No. 15/366,704 entitled "Panels Comprising a Mechanical Locking Device and an Assembled Product Comprising the Panels", filed Dec. 1, 2016.
Derelöv, Peter, et al., U.S. Appl. No. 15/415,356 entitled "Panels Comprising a Mechanical Locking Device and an Assembled Product Comprising the Panels", filed Jan. 25, 2017.
Fridlund, Magnus, U.S. Appl. No. 15/422,798 entitled "Set of Panels for an Assembled Product," filed Feb. 2, 2017.
Boo, Christian, U.S. Appl. No. 15/428,504 entitled "Set of Panel-Shaped Elements for a Composed Element," filed Feb. 9, 2017.
Fridlund, Magnus, U.S. Appl. No. 15/432,190 entitled "Method for Forming a Panel," filed Feb. 14, 2017.
Extended European Search Report issued in EP Application No. 17750523.7, Jul. 26, 2019, European Patent Office, Munich, DE, 7 pages.

* cited by examiner

ELEMENT AND METHOD FOR PROVIDING DISMANTLING GROOVE

CROSS REFERENCE TO RELATED APPLICATIONS

The present application claims the benefit of Swedish Application No. 1650159-5, filed on Feb. 9, 2016. The entire contents of Swedish Application No. 1650159-5 are hereby incorporated herein by reference in their entirety.

FIELD OF THE INVENTION

Embodiments of the present invention relate to a method for providing a dismantling groove in an element, such as a panel-shaped element, for a product to be assembled by a plurality of elements locked by a locking arrangement including a flexible tongue. Embodiments of the invention also relate to such an element comprising, in one and the same element, an insertion groove for receiving a tongue and a dismantling groove for receiving the dismantling tool. The elements can be dismantled by pushing the tongue into the insertion groove using the dismantling tool.

BACKGROUND OF THE INVENTION

A conventional furniture product may be assembled by a plurality of elements or panels. The panels may be assembled with a mechanical locking system, such as disclosed in, for example, WO 2012/154113 A1. The product comprises a first panel connected perpendicularly to a second panel by a mechanical locking system comprising a flexible tongue in an insertion groove.

In some situations, it may be desired to disassemble or dismantle the product after it has been assembled. WO2015/038059 discloses a product assembled by a plurality of elements that are locked by a mechanical locking system comprising a flexible tongue in an insertion groove. The insertion groove is provided in a first element and a dismantling groove is provided in a second element. The dismantling groove is adapted for insertion of a dismantling tool, which pushes the flexible tongue into the insertion groove, which facilitates dismantling of the elements.

The elements are generally produced in a continuous production process. The insertion groove and the dismantling groove of WO2015/038059 are provided in separate elements and using separate tools.

Embodiments of the present invention address a widely recognized need to provide an efficient production process for, and design of, an element that can be locked by a tongue with another element and be dismantled using a tool to dismantle assembled elements.

SUMMARY OF THE INVENTION

Accordingly, embodiments of the present invention preferably seek to mitigate, alleviate or eliminate one or more deficiencies, disadvantages or issues in the art, such as the above-identified, singly or in any combination by providing a method for providing a dismantling groove and an insertion groove in an element, and an element comprising a dismantling groove and an insertion groove in the same element.

For example, embodiments of the present invention may allow a new product to be produced in existing production equipment that is adapted to the number of available milling tool positions.

Embodiments may comprise a method for providing a dismantling groove in an element for a product to be assembled by a plurality of elements locked by a locking arrangement including a flexible tongue. The method may comprise providing an element having a first side and an opposing second side; providing an insertion groove in the element that extends along the element between the first side and the second side and that is configured for receiving a flexible tongue of the locking arrangement for locking the element to another element having a tongue groove; and providing a dismantling groove in the element that extends from the first side to the insertion groove and along a portion of the insertion groove, and being configured to receive a dismantling tool for dismantling the element from the other element. The element may comprise one or more of said dismantling groove.

The insertion groove and the dismantling groove may be provided by milling with a single milling tool having a first cutting surface for milling the insertion groove and a second cutting surface for milling the dismantling groove. The insertion groove may be milled with the milling tool in a first position and the dismantling groove may be milled by moving the milling tool in a radial direction relative its longitudinal axis to a second position. Then, the tool may be moved along the element to extend the length of the dismantling groove to a desired length.

The insertion groove may be provided with at least a first depth into the element along the entire insertion groove. It may also be provided with a second depth into the element at the location of the dismantling groove and such that the second depth is deeper than the first depth.

Providing the dismantling groove may comprise providing a guide surface that extends from the first side towards the second side and that is angled at least partially less than 90 degrees relative the first side.

A single milling tool may be controlled to mill the insertion groove and the dismantling groove in a continuous milling action.

Embodiments may comprise an element for a product to be assembled by a plurality of elements locked by a locking arrangement including a flexible tongue. The element may comprise a first side and an opposing second side; an insertion groove extending along the element and between the first side and the second side, and being configured for receiving a flexible tongue of a locking arrangement for locking the element to another element; and a dismantling groove extending from the first side to the insertion groove and along a portion of the insertion groove, and being configured to receive a dismantling tool for dismantling the element from the other element.

The depth of the insertion groove may be extended at the location of the dismantling groove.

A guide surface of the dismantling groove may extend from the first side towards the insertion groove and be angled at least partially less than 90 degrees relative the first side.

Some embodiments provide for an efficient production process for, and design of, an element with an insertion groove for a flexible tongue and a dismantling groove for receiving a dismantling tool to dismantle assembled elements locked by the flexible tongue. Since the dismantling groove and the insertion groove are provided in the same element, an efficient production process is facilitated for. It also facilitates using a single tool for providing both the dismantling groove and the insertion groove, wherein the production process may be made even more efficient. Also, the element may be produced in production lines already producing elements with an insertion groove. Such existing production lines only need to be updated with a new tool, and programmed to control the tool to generate the dismantling groove. Hence implementation into existing production lines is both time and cost efficient. The design of the element also provides for assembling the element with other elements efficiently to a stable product, which may also be disassembled if desired.

The term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which embodiments of the invention are capable of, will be apparent and elucidated from the following description of embodiments of the present invention, reference being made to the accompanying drawings, in which.

DESCRIPTION OF EMBODIMENTS

Figure 1:
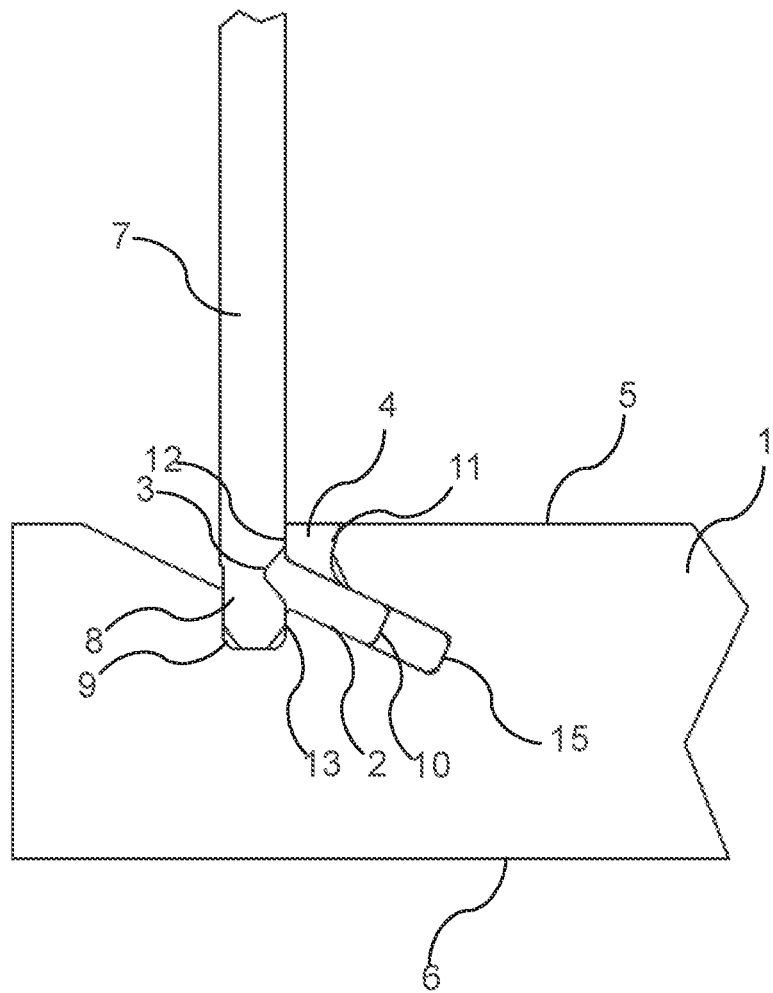
FIG. 1 is a cross-sectional view of an element and another element illustrating the insertion groove and the dismantling groove.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The present description of an embodiment is given with reference to an element 1, such as a panel-shaped element, that may be arranged perpendicular to another panel-shaped element 7. The elements may be locked together with a mechanical locking device as an example only. The panels may be assembled and locked together to obtain a product, e.g. furniture, such as a bookshelf, a cupboard, a wardrobe, a box, a drawer or a furniture component. The locking device may comprise a flexible tongue. It should be born in mind, however, that embodiments of the present invention is not limited strictly to furniture, but can be easily adapted to any product wherein elements are assembled by locking devices. Further examples of the product and the mechanical locking device can be found in WO2015/105449 and WO2015/038059, which are incorporated herein by reference in their entirety for all purposes, particularly with regard to arranging a flexible tongue in an insertion groove 2 for locking in a tongue groove 3 of another element.

FIG. 1 illustrates the element 1 comprising a dismantling groove 4 as well as the insertion groove 2 in one and the same element 1. The insertion groove 2 extends along the element 1 and from a first side 5 towards a second side 6 of the element 1. Also, the insertion groove 2 may extend along an edge of the element, and be located a distance from the edge. The dismantling groove 4 extends from the first side 5 to the insertion groove 2. The dismantling groove 4 is configured to receive a dismantling tool 60 for pushing the tongue away from the tongue groove 3. Since the insertion groove 2 and the dismantling groove 4 are provided in the same element, the production process may be simplified, making it more efficient to produce, and may be thus more cost efficient. Particularly, it allows, in embodiments, for using a single tool for providing the insertion groove 2 as well as the dismantling groove 4. This in turn means that the panel is particularly suited to be produced in existing production equipment where elements are produced with an insertion groove 2, but in which a separate tool for providing the dismantling groove 4 cannot be added, or added with significant difficulty. However, the insertion groove 2 and the dismantling groove 4 may in some embodiments be provided using separate tools, which may be still more efficient than providing the insertion groove and the dismantling groove in separate elements.

FIG. 1 illustrates an embodiment of the element 1 arranged for assembly using a locking device for locking the element 1 to an adjacent element 7. The element 1 and the adjacent element 7 may be boards or panels of a furniture product that are connected perpendicular to each other, i.e., with a main surface of the element 1 perpendicular to a main surface of the adjacent element 7. An edge section 8 of the adjacent element 7 is arranged in an edge section groove 9 of the element 1 for locking the adjacent element 7 and the element 1 together in a first direction. A locking device in the form of a flexible tongue may be arranged in the insertion groove 2 in the edge section groove 9 and extend into a tongue groove 3 at the edge section 8. The tongue groove 3 and a tip of the tongue extending into the tongue groove 3 may have complementary shapes. The flexible tongue and the tongue groove 3 cooperate for locking the element 1 and the adjacent element 7 together in a second direction, which is essentially perpendicular to the first direction. The flexible tongue is, during assembly of the element 1 and the adjacent element 7, pushed into the insertion groove 2 when the edge section 8 is inserted into the edge section groove 9. The flexible tongue springs back and into the tongue groove 3 when the element 1 and the adjacent element 7 have reached a connected state.

Figure 2:
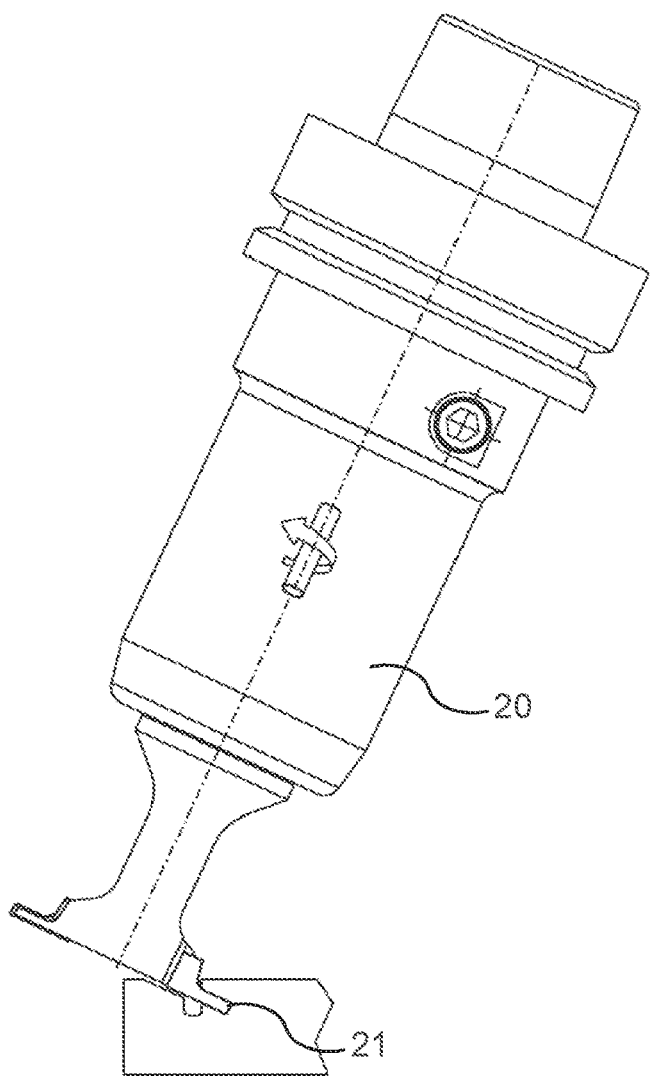
FIG. 2 is a partly cross-sectional view of the element and the tool for providing the insertion groove and the dismantling groove when the tool is in a position for only providing the insertion groove.
Figure 3:
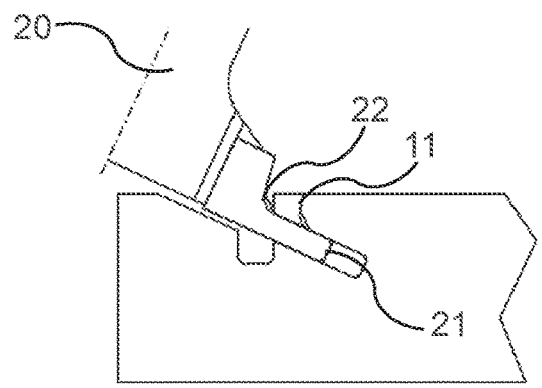
FIG. 3 is a cross-sectional view of the element and the tool for providing the insertion groove and the dismantling groove when the tool is in a position after the dismantling groove has been provided and is positioned for providing of the insertion groove.

FIGS. 2-3 illustrate embodiments of a method for providing the dismantling groove 4 in the element 1. The element 1 may be panel-shaped having a first side 5 and an opposing second side 6. Various other grooves and/or profiles may already be present in the element 1, such as the edge section groove 9. The insertion groove 2 and the dismantling groove 4 may be provided using a milling tool. The element 1 may be passed through a production line wherein a number of milling tools are present in order to provide various grooves, recesses and profiles along the element 1.

As is illustrated in FIG. 2, the insertion groove 2 is provided in the element 1 such that it extends along the element 1, for example along an edge of the element 1, and between the first side 5 and the second side 6. Also, the insertion groove 2 is configured for receiving a flexible tongue of a locking arrangement for locking the element 1 to the adjacent element 7 having the tongue groove 3. The insertion groove 2 may be provided to extend at a non-perpendicular angle relative the first side 5, such that the tongue is arranged non-perpendicularly relative the adjacent element 7. For example, the insertion groove 2 may be provided to extend at an angle of 20° to 70°, for example, 30 to 45°. The dismantling groove 4 is provided in the same element 1 as the insertion groove 2 and such that it extends from the first side 5 to the insertion groove 2. Hence, access to the insertion groove 2, and thus to a tongue when arranged therein, is provided from the first side 5 of the element 1.

The dismantling groove 4 is configured to receive a dismantling tool 60 for dismantling the element 1 from the adjacent element 7. For example, at least one dismantling groove 4 may extend along a portion of the insertion groove 2. For example, a dismantling groove 4 may be 2 to 20% of the length of the insertion groove, for example, 5 to 10% of the length of the insertion groove. Multiple tongues may be arranged spaced apart in the insertion groove 2. Each tongue may, e.g., be about 20-400 mm long. If multiple tongues are provided in the same element 1, the tongues may be spaced apart, e.g., 0.5-1 times the length of the tongue. The distance between two tongues depends on the required strength of the locking arrangement. No distance or a shorter distance, such as about 1 mm to about 5 mm, between two tongues provides a stronger locking arrangement.

The dismantling groove 4 may be provided to coincide with the location between the locations for two tongues. Hence, the dismantling groove 4 may be about 20-80 mm long, or about the same length as, or shorter than, the distance between two tongues. This provides for inserting a dismantling tool through the dismantling groove 4, and pushing the dismantling tool along the insertion groove 2. If the dismantling groove is provided on a top surface of the element 1 and visible during use of the element 1, the dismantling groove 4 may be about 20-50 mm long. If the dismantling groove is provided on a bottom surface of the element 1 and non-visible during use of the element 1, the dismantling groove 4 may be about 20-80 mm long. Hence, different elements may have different lengths of the dismantling groove 4 in order to optimize strength and at the same time reduce the impact on surfaces that are used. For example, reducing the length on visible surfaces reduces the risk of dust and particle agglomeration in such surfaces.

The dismantling tool may, e.g., be rod-shaped with a cross-sectional shape that substantially corresponds to a portion of the cross-sectional shape of the insertion groove 2. A tip of the dismantling tool may be pointed, such that the tongue is pushed into the insertion groove 2 and away from the tongue groove 3 when the dismantling tool is positioned between the tongue and the tongue groove 3.

The dismantling groove 4 is sufficiently wide to receive the dismantling tool, and may be about 1-3 mm, preferably about 2 mm. The dismantling groove 4 measured from the edge section groove 9 parallel with the first side 5 has a first width. The insertion groove 2 measured from the edge section groove 9 parallel with the first side 5 has a second width, which is larger than the first width. Hence, insertion groove 2 may be configured for a flexible tongue that may be received between the dismantling tool and a bottom wall 10 (FIG. 1) of the insertion groove 2 when the dismantling tool is received in the insertion groove 2. FIG. 1 shows a cross-section of element 1, wherein, at the location of the dismantling groove 4, the bottom of the insertion groove 2 is extended to a second depth into the element 1, providing a deeper bottom wall 15 in a portion of the insertion groove 2 which coincides with the dismantling groove 4.

In some embodiments, the insertion groove 2 and the dismantling groove 4 are provided by milling with a single milling tool 20, such as illustrated in the embodiment of FIG. 3. The milling tool 20 may have a first cutting surface 21 for milling the insertion groove 2 and a second cutting surface 22 for milling the dismantling groove 4. The insertion groove 2 may be milled with the milling tool 20 in a first position, such as the position illustrated in FIGS. 2-3. The dismantling groove 4 may be milled by moving the milling tool in a radial direction relative its longitudinal axis to a second position while the element 1 and/or the tool is moving along the element 1. When the length of the dismantling groove 4 has been provided, the milling tool 20 is returned to the first position. Hence, the insertion groove 2 as well as the dismantling groove 4 may be generated simultaneously while the milling tool 20 is in the second position. This provides for increased efficiency for producing the element 1. It also provides for high production tolerances between the insertion groove 2 and the dismantling groove 4, which will be provided with a fixed relationship. This in turn leads to a stable assembled product. When the milling tool is in the first position, only the insertion groove 2 may be provided but not the dismantling groove 4. Hence, milling tool 20 may be controlled to mill, e.g. by CNC milling, the insertion groove 2 and the dismantling groove 4 in a continuous milling action, such as while the element 1 is passed along a production line.

In some embodiments, the insertion groove 2 is provided with a first depth into the element 1 along the insertion groove 2. At the location of the dismantling groove 4, the depth of the insertion groove 2 may be extended to a second depth into the element 1, which is deeper than the first depth. For example, the difference between the second depth and first depth may be correlated to the width of the insertion groove 2. Hence, the insertion groove 2 and the dismantling groove 4 may be provided with a single tool in a continuous, or substantially continuous, action.

In some embodiments, such as illustrated in FIG. 1, the dismantling groove 4 is provided with a guide surface 11 extending from the first side 5 of the element 1 towards the second side 6 of the element 1 and along the insertion groove 2. The guide surface may be angled at less than 90 degrees relative the first side 5 of the element 1. For example, the guide surface may be angled 45 to 85 degrees, for example, 60 to 80 degrees, relative to the first side 5 of the element 1. The dismantling groove 4 has an opening at the first side 5 of the element 1 that is wider than further down in the dismantling groove 4 towards the insertion groove 2, which forms the guide surface. This provides for guiding the dismantling tool towards the insertion groove 2. In some embodiments, the guide surface is straight. In other embodiments, such as illustrated in FIG. 3, the guide surface 11 is curved between first side 5 and the insertion groove 2. This forms a narrowed portion of the dismantling groove. This further facilitates guiding the dismantling tool to a correct position in the insertion groove 2 without jamming the tool when it is positioned below the narrowed portion for pushing the tongue into the insertion groove 2. When the dismantling groove 4 is curved with a widened portion towards the insertion groove 2, the guide surface may initially be angled less than 90 degrees relative the first side 5 at the first side, and have a gradually increased width from a narrowed section and towards the insertion groove 2 such that it is angled more than 90 degrees relative the first side 5 when it reaches the insertion groove 2. Such a curved guide surface may be provided with the second cutting surface 22 of the tool 20 having a curved shape.

The method embodiments described above may be used to produce the element 1, such as in wood, composite wood, laminate, plastic etc. The element may be a panel, comprising a wood based material, such as a MDF or HDF panel, a particleboard or a plywood board. The panel may be covered by a decorative layer. The element 1 may also be produced using other production techniques, such as extrusion, wherein milling is not required. Such an element 1 comprises the first side 5 and the opposing second side 6. The insertion groove 2 extends along the element 1 and between the first side 5 and the second side 6. The insertion groove 2 may extend at a non-perpendicular angle relative the first side 5. Also, the insertion groove 2 is configured for receiving a flexible tongue of a locking arrangement for locking the element 1 to another element, such as adjacent element 7. The dismantling groove 4 extends from the first side 5 to the insertion groove 2 and along a portion of the insertion groove 2.

The dismantling groove 4 is configured to receive a dismantling tool for dismantling the element 1 from the other element. The dismantling groove 4 may be open towards the edge section groove 9 of the element 1. Hence, the dismantling groove 4 may have one or several walls 4a, 4b, 4c (FIG. 4c) extending from the first side 5 of the element 1 to the insertion groove 2, and from one end of the dismantling groove 4 to the other end of the dismantling groove 4 along the insertion groove 2. Hence, the dismantling groove 4 may have a substantially U-shaped cross section taken parallel to the first side 5.

When the adjacent panel 7 is positioned in the edge section groove 9, it is supported by an upper side surface 12 of the edge section groove 9, which may be substantially perpendicular to the first side 5, at the positions where only the insertion groove 2 is located, i.e., where the dismantling groove 4 is not located. It is also supported by a lower side surface 13 of the edge section groove 9, which is parallel with the upper side surface 12. At the location of the dismantling groove 4, the adjacent panel 7 is only supported by the lower side surface 13. This provides for sufficient stability of the adjacent panel 7 and yet an efficient production of the element 1 with the insertion groove 2 and the dismantling groove 4.

Figure 4A:
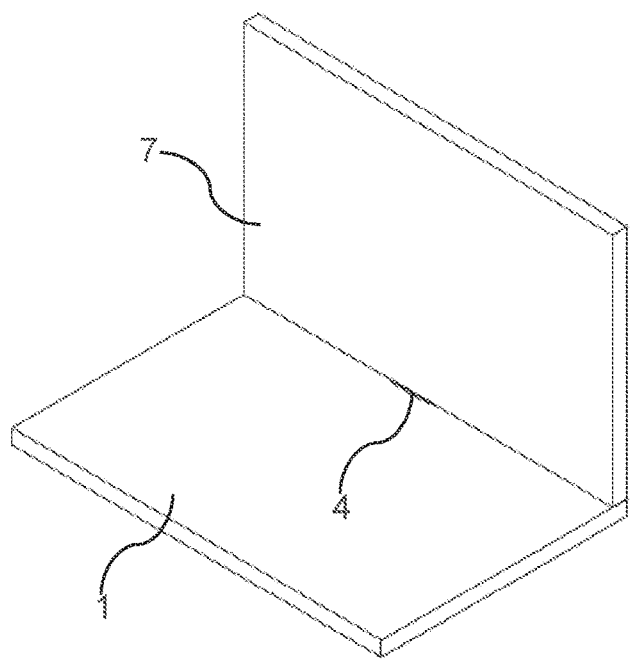
FIG. 4a is a perspective view of the element connected to the adjacent element and illustrating a dismantling groove along an edge of a portion of the element 1.
Figure 4B:
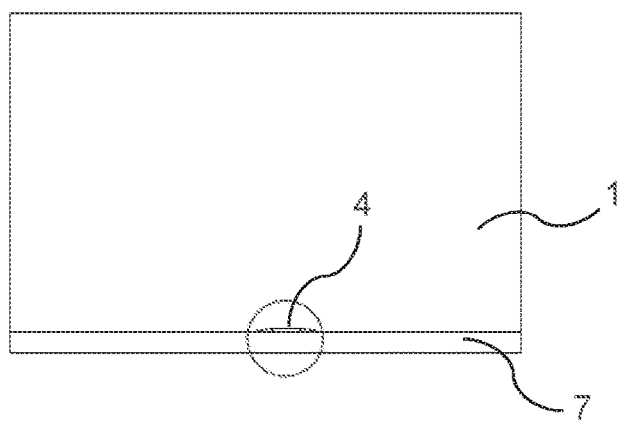
FIG. 4b is a top view of the element connected to the adjacent element and illustrating a dismantling groove along an edge of a portion of the element 1.
Figure 4C:
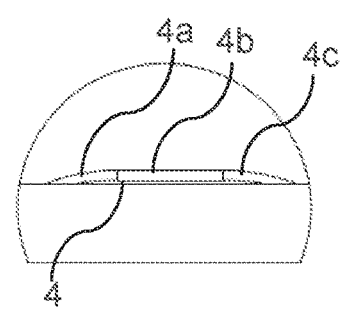
FIG. 4c is an enlarged top view of the dismantling groove of FIG. 4b.

FIGS. 4a-4c illustrates the element 1 connected to the adjacent panel 7. A single dismantling groove 4 is provided in the element 1, and between two insertion grooves (not illustrated). Multiple dismantling grooves 4 may be provided as described above. As can be seen in FIGS. 4a and 4b, the dismantling groove 4 extends along the element 1. Furthermore, the dismantling groove 4 is open towards the adjacent element 7. As is illustrated in FIG. 4c, the edge of the dismantling groove 4 at the first side 5 of the element 1 may be partly curved, such as with a curved section at each end of the dismantling groove 4 and a substantially straight section therebetween.

The element 1 and the other element 7 may be arranged such that the first side 5 with the dismantling groove 4 is facing upwards as in the illustrated in the FIGS. The panels may be arranged in any way e.g. such that the first side 5 with the dismantling groove 4 is facing downwards. A dismantling groove facing downward may have the advantage that the dismantling groove is less visible and/or that less particles, such as dust, are accumulated in the insertion groove.

Figure 5A:
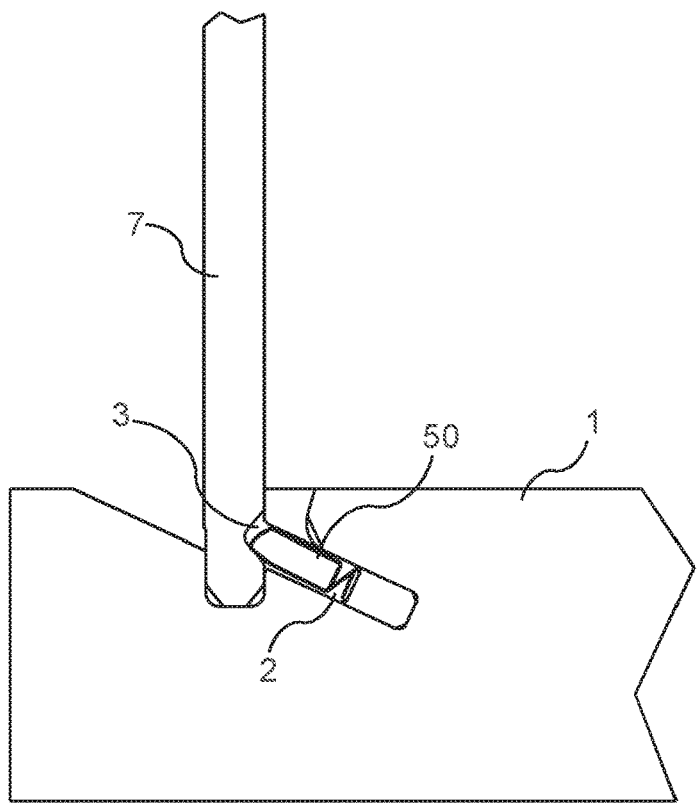
FIG. 5a is a cross-sectional view of the element and another element in a connected state.

FIG. 5a shows in a cross-sectional view an embodiment of the element 1 and the other element 2 in a connected state. The flexible tongue 50 cooperates with the tongue groove 3 for locking the adjacent element 7 and the element 1 together in the second direction.

Figure 5B:
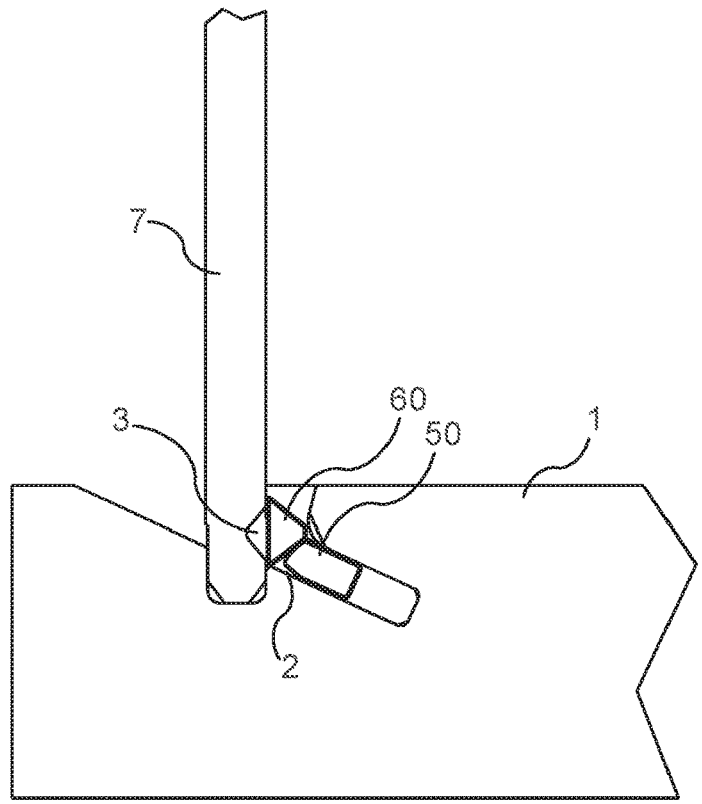
FIG. 5b is a cross-sectional view of the element and another element during an insertion of a dismantling tool.

FIG. 5b is a cross-sectional view an embodiment of the element 1 and other element 7 during an insertion of the dismantling tool 60 into the dismantling groove an the insertion groove 2.

It should also be appreciated that features disclosed in the foregoing description, and/or in the foregoing drawings and/or following claims both separately and in any combination thereof, be material for realizing the present invention in diverse forms thereof. When used in the following claims, the terms "comprise", "include", "have" and their conjugates mean, "including but not limited to".

When the word "about" is used in this specification in connection with a numerical value, it is intended that the associated numerical value include a tolerance of ±10% around the stated numerical value.

The present invention has been described above with reference to specific embodiments. However, other embodiments than the above described are equally possible within the scope of the invention. Different method steps than those described above may be provided within the scope of the invention. The different features and steps of the invention may be combined in other combinations than those described.

Embodiments

1. Method for providing a dismantling groove (4) in an element (1) for a product to be assembled by a plurality of elements locked by a locking arrangement including a flexible tongue, comprising:

providing an element (1) having a first side (5) and an opposing second side (6);

providing an insertion groove (2) in the element (1) that extends along the element (1) between the first side (5) and the second side (6) and that is configured for receiving a flexible tongue of a locking arrangement for locking the element (1) to another element (7) having a tongue groove (3); and providing a dismantling groove (4) in the element (1) that extends from the first side (5) to the insertion groove (2) and along a portion of the insertion groove (2), and being configured to receive a dismantling tool for dismantling the element (1) from the other element (7).

2. The method according to embodiment 1, comprising providing the insertion groove (2) and the dismantling groove (4) by milling with a single milling tool (20) having a first cutting surface (21) for milling the insertion groove (2) and a second cutting surface (22) for milling the dismantling groove (4), and milling the insertion groove (2) with the milling tool (20) in a first position and the dismantling groove (4) by moving the milling tool (20) in a radial direction relative its longitudinal axis to a second position.

3. The method according to any of the previous embodiments, comprising providing the insertion groove (2) with at least a first depth into the element (1) along the entire insertion groove (2), and providing the insertion groove (2) with a second depth into the element (1) at the location of the dismantling groove (4) and such that the second depth is deeper than the first depth.

4. The method according to any of the previous embodiments, wherein providing the dismantling groove (4) comprises providing a guide surface (11) extending from the first side (5) towards the second side (6) and being angled at least partially less than 90 degrees relative the first side (5).

5. The method according to any of the previous embodiments, comprising controlling a single milling tool (20) to mill the insertion groove (2) and the dismantling groove (4) in a continuous milling action.

6. The method according to any of the previous embodiments, wherein the first side (5) comprises a edge section groove (9) and the other element (7) comprises an edge section (8), wherein the edge section (8) is configured to cooperate with the edge section groove (9) for locking the other element (7) and the element (1) together in a first direction.

7. The method according embodiment 6, wherein the edge section groove (9) comprises the insertion groove (2).

8. The method according embodiment 6 or 7, wherein in the edge section (8) comprises the tongue groove (3), wherein the flexible tongue is configured to cooperate with the tongue groove (3) for locking the other element (7) and the element (1) together in a second direction, which is perpendicular to the first direction.

9. Element (1) for a product to be assembled by a plurality of elements locked by a locking arrangement including a flexible tongue, comprising
a first side (5) and an opposing second side (6);
an insertion groove (2) extending along the element (1) and between the first side (5) and the second side (6), and being configured for receiving a flexible tongue of a locking arrangement for locking the element (1) to another element (7); and
a dismantling groove (4) extending from the first side (5) to the insertion groove (2) and along a portion of the insertion groove (2), and being configured to receive a dismantling tool for dismantling the element (1) from the other element (7).

10. The element according to embodiment 9, wherein the depth of the insertion groove (2) is extended at the location of the dismantling groove (4).

11. The element according to any of embodiments 9 or 10, wherein a guide surface (11) of the dismantling groove (4), which extends from the first side (5) towards the insertion groove (2), is angled at least partially less than 90 degrees relative the first side (5).

12. The element according to any of embodiments 9-11, wherein the first side (5) comprises a edge section groove (9) and the other element (7) comprises an edge section (8), wherein the edge section (8) is configured to cooperate with the edge section groove (9) for locking the other element (7) and the element (1) together in a first direction.

13. The element according to embodiment 12, wherein the edge section groove (9) comprises the insertion groove (2).

14. The element according to embodiment 12 or 13, wherein in the edge section (8) comprises the tongue groove (3), wherein the flexible tongue is configured to cooperate with the tongue groove (3) for locking the other element (7) and the element (1) together in a second direction, which is perpendicular to the first direction.

15. The element according to any of embodiments 9-14, wherein the flexible tongue is configured to be pushed into the insertion groove (2) when the edge section (8) is inserted into the edge section groove (9) during assembly of the element (1) and the other element (7) or during dismantling.

16. The element according to embodiment 15, wherein the flexible tongue springs back and into the tongue groove (3) when the element (1) and the other element (7) have reached a connected state.

The invention claimed is:

1. Method for providing a dismantling groove in a first element for a product to be assembled so as to include a plurality of elements that are locked by a locking arrangement including a flexible tongue, the method comprising:
providing the first element, which has a first side and an opposing second side;
providing an insertion groove in the first element, which insertion groove extends along the first element between the first side and the second side and is configured for receiving the flexible tongue of the locking arrangement for locking the first element to a second element having a tongue groove; and
providing a dismantling groove in the first element, which dismantling groove extends from the first side to the insertion groove and along a portion of the insertion groove, and is configured to receive a dismantling tool for dismantling the first element from the second element;
the providing of the insertion groove and the providing of the dismantling groove comprising milling with a single milling tool having a first cutting surface for milling the insertion groove and having a second cutting surface for milling the dismantling groove, wherein the milling of the insertion groove is carried out with the milling tool in a first position with respect to a radial direction that is radial relative to a longitudinal axis of the milling tool, and wherein the milling of the dismantling groove is carried out by moving the milling tool to a second position spaced in the radial direction from the first position.

2. The method according to claim 1, comprising providing the insertion groove with at least a first depth into the first element along the entire insertion groove, and providing the insertion groove with a second depth into the first element at the location of the dismantling groove and such that the second depth is deeper than the first depth.

3. The method according to claim 1, wherein providing the dismantling groove comprises providing a guide surface extending from the first side towards the second side and having at least a portion that is angled less than 90 degrees relative the first side.

4. The method according to claim 1, comprising controlling the single milling tool to mill the insertion groove and the dismantling groove in a continuous milling action.

5. The method according to claim 1, wherein the first side comprises an edge section groove and the second element comprises an edge section, wherein the edge section is configured to cooperate with the edge section groove for locking the second element and the first element together.

6. The method according claim 5, wherein the edge section groove is contiguous with the insertion groove.

7. The method according claim 5, wherein the edge section comprises the tongue groove, wherein the flexible tongue is configured to cooperate with the tongue groove for locking the second element and the first element together.

* * * * *